United States Patent [19]
Kirtley, Jr. et al.

[11] 3,956,648
[45] May 11, 1976

[54] SUPERCONDUCTING MACHINE HAVING FLEXIBLE SHIELD MEANS OPERABLE TO PROTECT THE SUPERCONDUCTING FIELD WINDING AGAINST TRANSIENTS

[75] Inventors: James L. Kirtley, Jr., Brookline; Gerald L. Wilson, Wayland, both of Mass.

[73] Assignee: Massachusetts Institute of Technology, Cambridge, Mass.

[22] Filed: Nov. 13, 1974

[21] Appl. No.: 523,603

[52] U.S. Cl. ............................. 310/40 R; 310/10
[51] Int. Cl.² .......................................... H02K 9/00
[58] Field of Search .................. 310/52, 10, 40, 54, 310/165, 211, 126, 198, 201, 205

[56] References Cited
UNITED STATES PATENTS

| | | | |
|---|---|---|---|
| 3,562,569 | 2/1971 | Koechlin | 310/211 |
| 3,644,766 | 2/1972 | Hughes | 310/165 |
| 3,648,082 | 3/1972 | MacNab | 310/10 |
| 3,679,920 | 7/1972 | MacNab | 310/10 |
| 3,742,265 | 6/1973 | Smith | 310/52 |
| 3,743,867 | 7/1973 | Smith | 310/52 |
| 3,743,875 | 7/1973 | Smith | 310/198 |
| 3,781,578 | 12/1973 | Smith | 310/52 |
| 3,816,780 | 7/1974 | Smith | 310/52 |

*Primary Examiner*—R. Skudy
*Attorney, Agent, or Firm*—Arthur A. Smith, Jr.; Robert Shaw; Martin M. Santa

[57] ABSTRACT

A superconducting machine wherein the field winding and associated elements in the cold region of the machine are protected against transients by a flexible, electrically conductive outer shield means that interacts with an inner conductive shell in a way that causes the magnetic field to be compressed between the shield and the shell, thereby to transmit mechanical radial forces between the two.

13 Claims, 10 Drawing Figures

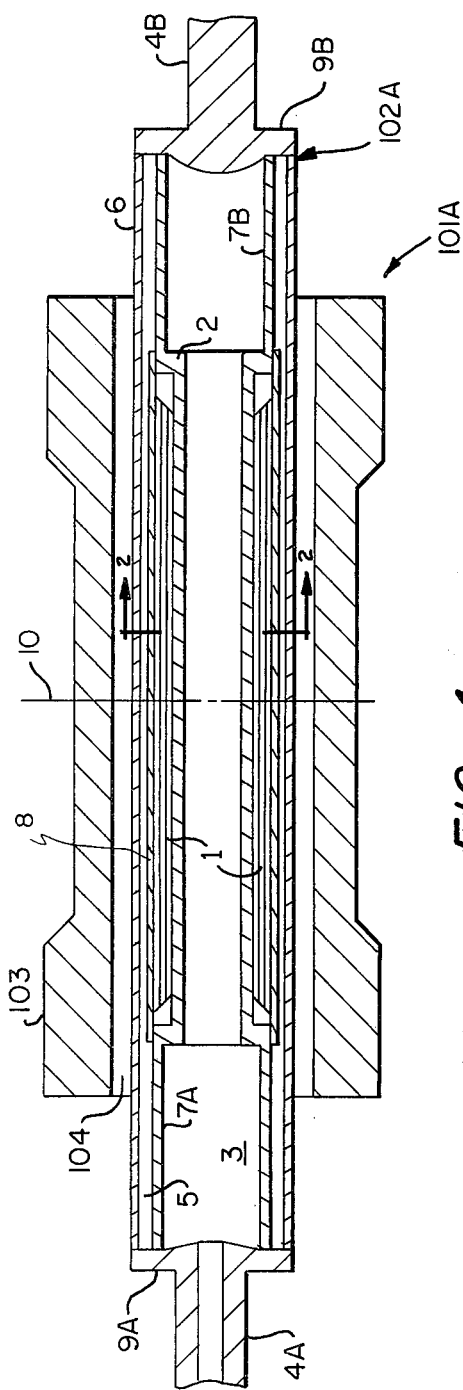
FIG. 1
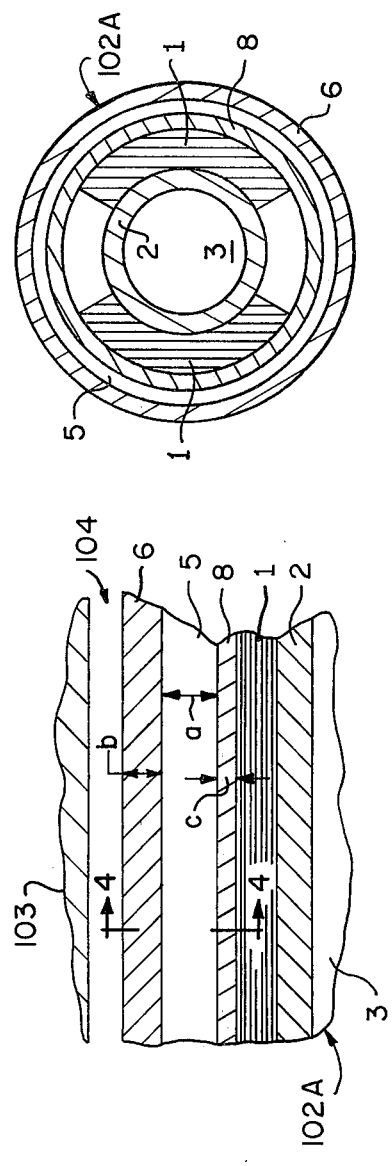
FIG. 2
FIG. 3
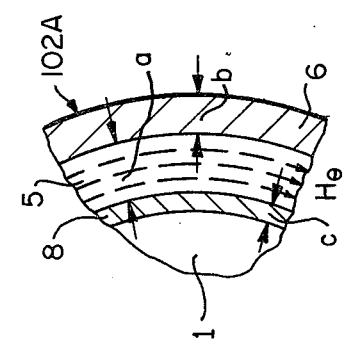
FIG. 4

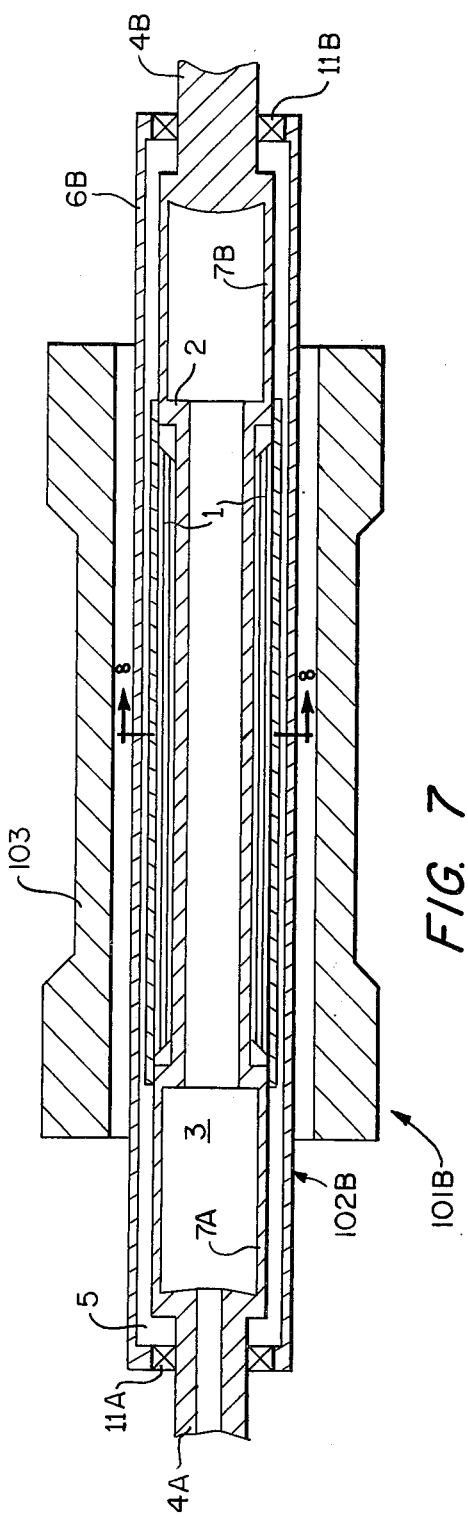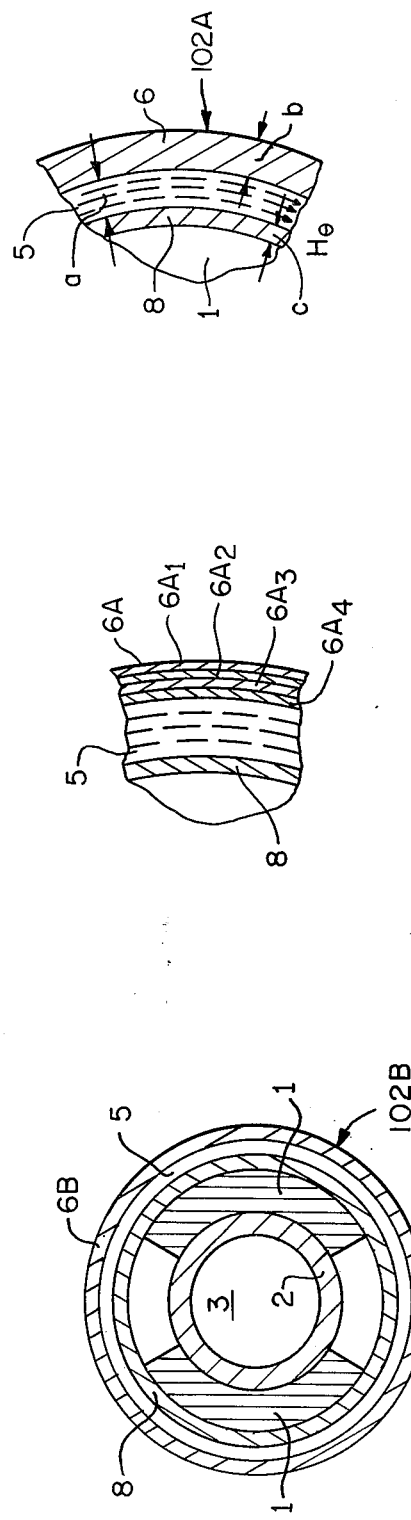
FIG. 5
FIG. 6
FIG. 7
FIG. 8

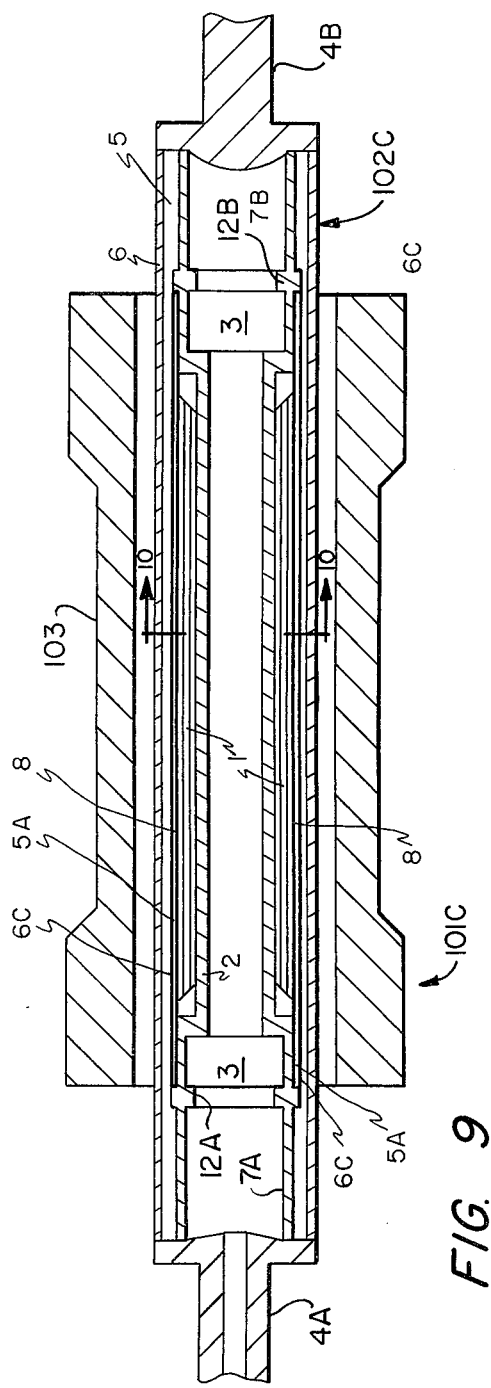
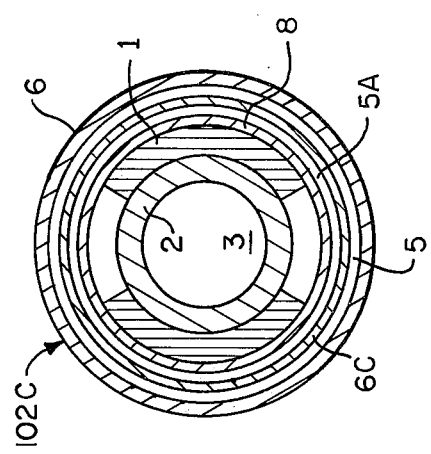
FIG. 9
FIG. 10

SUPERCONDUCTING MACHINE HAVING FLEXIBLE SHIELD MEANS OPERABLE TO PROTECT THE SUPERCONDUCTING FIELD WINDING AGAINST TRANSIENTS

The present invention relates to a superconducting machine wherein provision is made to mitigate the effects of transients upon the elements located in the cold region of the machine.

By way of background, attention is called to United States Pat. No. 3,742,265 (Smith, Jr.) and the many patents, etc. therein cited.

As is noted in the Smith, Jr. patent, superconducting machines can be made with the cryogenic parts on either the rotor or the stator and machines include all the electrical configurations available in normally conducting apparatus. To simplify this specification, the explanation is made with respect to alternators, but the problems solved by the present invention have wider applicability.

Under fault or other transient conditions, the damper shield (called also electrothermal, magnetothermal, magnetic or thermal shield) of a superconducting alternator is subjected to two types of magnetically induced mechanical stresses. One of the stresses results in strong alternating torques. The other is a sinusoidally distributed pressure described by the expression $$trr = -\sigma_2 \cos^2 p\theta$$

where $trr$ is the pressure ($\sim$ several thousand psi) distribution on the shield in the radial direction, $\sigma$ is the maximum pressure, $p$ is the number of pole-pairs, and $\theta$ is the azimuthal angle around the shield.

The alternating torques apply torsional forces to the shield. These torsional forces must then be passed through the end structure and then to the shaft of the machine. The sinusoidally distributed pressure applies radial forces to the rotor elements, in the form of an ovalizing and crushing loading. The cryogenic temperatures in the cold region of the rotor and the need to effect thermal isolation of that region from the warm ambient temperature places severe restraints on the mechanical structures. In particular, it is not possible to support the shield structure radially upon the cold field winding underneath, at least not with mechanical means, for these would introduce prohibitive heat leak. Thus, the general form that the thermal isolation structure has taken is a series of cylindrical structures, separated by a thermal isolation vacuum. Torque is taken quite naturally in shear stress in these cylindrical structures. The problem comes in supporting radial stresses of the type experienced during a fault, which are of such nature that they impose bending stresses on the cylindrical structure of the outer rotor shield. These bending stresses can be quite large, even for moderate radial stresses, and providing a structure that is strong enough to carry them imposes a severe penalty in terms of active volume of the machine.

Accordingly, it is an object of this invention to provide a shielding mechanism that acts to reduce the effects of transients upon the elements in the cold region of a superconducting machine.

Another object is to provide a shielding mechanism that is structurally sound, but which takes up little active volume of a superconducting machine.

These and still further objects are discussed hereinafter and are particularly delineated in the appended claims.

The objects are attained in a superconducting machine wherein there is provided shield means between the superconducting field winding of the machine and its normally conducting armature. The shield means comprises a cylindrical shield disposed between the superconducting field winding and the armature, the cylindrical shield being adapted to flex radially and being electrically conductive. A stiff conductive shell is positioned between the cylindrical shield and the superconducting field winding; the magnetic field of the superconducting field links both the cylindrical shield and the conductive shell in such a way that the transient radial loading of the cylindrical shield due to faults or other transients are carried on compression of the magnetic field between the two. Said another way, transient radial loading results in radial deflection of the cylindrical shield and compression of the magnetic field, thereby transmitting forces from the cylindrical shield to the conductive shell.

The invention is hereinafter described with reference to the accompanying drawing in which:

FIG. 1 is a side-section view, diagrammatic in form, of a superconducting rotating machine embodying the present invention, the superconducting winding of the machine being on the rotor, said rotor having as well, a conductive shell about the winding and a flexible cylindrical shield outwardly disposed from the conductive shell;

FIG. 2 is a section view taken upon the line 2—2 in FIG. 1, looking in the direction of the arrows;

FIG. 3 is an enlarged side-section view showing a part of the machine in FIG. 1;

FIGS. 4 and 5 are partial section view of the rotor, taken upon the line 4—4 in FIG. 3, looking in the direction of the arrows and are intended to show compression of the magnetic field H from the normal condition in FIG. 4 to the compressed condition in FIG. 5;

FIG. 6 is a section view, similar to FIG. 5, but showing a multi-layered flexible cylindrical shield;

FIG. 7 is a side-section view similar to the view in FIG. 1 of a modification of the apparatus of FIG. 1;

FIG. 8 is a section view taken upon the line 8—8 in FIG. 7, looking in the direction of the arrows;

FIG. 9 is a side-section view of a further modification; and

FIG. 10 is a section view taken upon the line 10—10 in FIG. 9, looking in the direction of the arrows.

Turning now to FIGS. 1 and 2, a superconducting machine embodying the present invention concepts is shown at 101A comprising a rotor 102A with a superconducting field winding, a normally conducting armature 103 and an air gap 104. The field winding is shown as having two poles, but it can have more. Some general comments follow with regard to superconducting machines as they have now evolved in the art to date, and the comments hereinafter are restricted to the rotor; a detailed discussion of a preferred form of armature is contained in U.S. Pat. No. 3,743,875 (Smith, Jr. et al).

The rotor 102A has a rotor body 2 which is a cylinder of stainless steel upon which the field winding 1 is wound. The axial interior portion is a vacuum space 3. The rotor is supported at its ends by shafts 4A and 4B, the shaft 4A being hollow to allow entry of liquid helium for cooling and the shaft 4B being a torque transmitting shaft. The vacuum space 3 provides thermal isolation between the cold region about the winding 1 and the ends of the rotor to reduce axial heat transfer and a vacuum space 5 reduces radial heat transfer. Cylindrical end members 7A and 7B serve to transmit torsional and other forces between the cold region around the winding 1 and the warm ambient. A cylindrical shield 6 serves as a damper and radiation shield to protect the cold parts around the superconducting winding 1. It is interaction between the cylindrical shield 6 and a conducting shell 8 that underlies the invention, as now explained.

In the previously proposed superconducting machines, the shield 6 is made to absorb all the torsional and radial forces introduced by faults and other transients to the machine rotor. In very large machines, such requirement dictates a thickness of the shield 6 that is prohibitive, since, it will be recalled, the space 5 lends no intermediate support to the shield 6 between the end pieces labeled 9A and 9B. Bending forces upon the shield at its axial center 10 are therefore great. In the present device, those bending forces are shared by the shield 6 with the conductive shell 8, the winding 1 and the rotor body 2, the three rotor elements in the cold region forming a composite structure to absorb radial shocks. As previously noted, the three elements in the cold region are attached to the ends 9A and 9B by the cylindrical supports 7A and 7B. The supports 7A and 7B must be thin to minimize axial thermal transfer to the warm region but must be thick enough to transfer torque loads to and from the cold regions. The torque loads, as mentioned, are reduced by the shield 6; hence, concern here is with radial loads with which the members 7A and 7B are best able to contend since they are compressive forces. In fact, it can be shown that a small fraction only of the radial forces ever gets to the end members 7A, since they tend to cancel one another, mostly, as now explained with reference to FIGS. 4 and 5.

The condition depicted in FIG. 4 is one in which no transient radial forces are applied in the rotor 102A. In that circumstance, magnetic field lines $H_\theta$, represented both as to direction and intensity by the three broken lines shown, occupy the space 5. As is above noted, during transient the rotor is subjected to the sinusoidally distributed pressure which is the radial force here-involved. As later discussed in detail, in the machine 101A the cylindrical shield 6 is made radially flexible, that is, it deflects in an ovalizing fashion under the radial forces, thereby reducing the cross dimension $a$ of the space 5 from that shown in FIG. 4 to that shown in FIG. 5. The field lines H are compressed, as shown, inducing eddy current forces in the highly conductive shell 8 and in the shield 6. As shown, the shell 8, the winding 1 and the rotor body 2 are mechanically secured to one another so that the strain due to transients is distributed among the three parts. Furthermore, transient loading on the three rotor parts in the cold region is mitigated in that force transfer through the magnetic field is the electric analog of a resilient pad. The shell 8 can be thermally isolated from the rest of the rotor body by thermal insulation pieces (i.e., the members 7A and 7B in FIG. 1) that can transmit mechanical forces. It will be observed that the radial forces tend to cancel one another, since the tubular elements involved are placed in compression. A force upon the winding 1 is a distributed, mostly compressive force that the winding is most able to tolerate. On the basis of the foregoing explication it can now be appreciated that the effects of transients on the cold parts of the machine are minimal. It should be further appreciated that the thickness dimensions $b$ and $c$, respectively, of the shield 6 and the shell 8 are important, as is the cross dimension $a$ of the space 5. Also, the intensity of the magnetic field in the space 5, the conductivity of the shield 6 and the shell 8 have direct and important bearing on the problem. Ideally, of course, the three dimensions should be just adequate to prevent touching of the shield 6 and the shell 8 at the center portion 10 during conditions of maximum fault loading. The shell 8 is made of material that has a high conductivity at liquid helium temperature (e.g., aluminum). The shield 6 can be made of several separate cylindrical shells to permit deflection of the type found in a leaf spring, as later discussed, or a composite shield can be provided such as, for example, a squirrel cage having axial conductive bars and end shield embedded in a non-conducting, flexible material such as fiberglass and epoxy; or a wound winding in a non-conducting flexible structure can be used (see an application for Letters Patent Ser. No. 523,604, filed Nov. 13, 1974 of Kirtley Jr. and Smith, Jr. that accompanies herewith). Since, as is discussed in some detail in the accompanying application, the shield 6 serves a damping function, the latter two modifications have considerable merit. It should be noted, however, that the wound shield 6 here is operated at or about ambient temperature; whereas, in the accompanying application it is not. Also, the shell 8 can be a squirrel cage or it can be a wound winding as discussed in the Kirtley, Jr. and Smith, Jr. application.

In FIG. 6, the cylindrical shield shown at 6A comprises a plurality of thin cylindrical shells $6A_1$, $6A_2$ . . . . The shield 6A like the shield 6 has high strength in torsion to resist twist, but under radial forces the shells deflect in the same fashion as a leaf spring.

In the modification shown in FIGS. 7 and 8, the cylindrical shield labeled 6B is free to rotate relative to the other elements in the rotor shown at 102B by virtue of bearings 11A and 11B. The shield 6B is an inertial shell (see said U.S. Pat. No. 3,742,265) that has sufficient inertia to absorb torsional forces due to transients but is sufficiently flexible to bend inwardly when subjected to radial forces. The cylindrical shield 6B, like the others herein shown, is supported only at its ends (in FIG. 7 by the bearings 11A and 11B) and is free to bend inwardly into the space 5 at any intermediate location between the ends, i.e., there are not intermediate mechanical supports to obstruct inward flexure. The major part of the radial loading due to transients is again taken up by the composite sandwich structure consisting of the tubular rotor body 2, the field winding 1 and the electrically conductive shell 8, which is at the cold region of the machine and which is mechanically attached only at or near the rotor ends by the thin tubular members 7A and 7B.

The superconducting machine shown at 101C in FIG. 9 has, in addition to the various elements in the machine 101A, an intermediate or inner flexible shield 6C which, as best shown in FIG. 10, is separated inwardly from the shield 6 by the vacuum space again numbered 5 and is separated from the electrically conductive shell 8 by a further vacuum space 5A. The cylindrical shield 6C, like the shield 6, is made to permit flexure toward its axis under radial loading and to transmit some of that loading to its only mechanical supports 12A and 12B and some to the sandwich structure comprising the shell 8, the winding 1 and the rotor body 2, as before. The intermediate shield 6C (and further such inner or intermediate flexible shields) is at a temperature that is between the cryogenic temperature of the field winding 1 and the shield 6.

It should be appreciated at this juncture and on the basis of what has been said, that what the inventors disclose is means by which radial loading (which is probably the most destructive type loading encountered in superconducting machines) is distributed over a number of the rotor mechanical elements and in a way that spreads the loading over a substantial portion of each element. In other words, the radial loading is not wholly, or even substantially, taken by any one element or any one portion of one element but is, rather, distributed. The concept is of great importance in the context of cryogenics which often dictate use of somewhat fragile structures to effect thermal isolation of the cold region but which also aggravate mechanical problems by rendering mechanical members in the cold regions susceptible to fatigue that would not always occur at ambient temperatures.

Modification of the invention herein disclosed will occur to persons skilled in the art and all such modifications are deemed to be within the scope of the appended claims.

What is claimed is:

1. A superconducting machine having, in combination: a cylindrical-shaped rotor having a superconducting field winding; a normally conducting armature on the stator of the machine, the machine being a nested configuration with the rotor positioned within the stator; shield means disposed on the rotor between the superconducting field winding and the normally conducting armature, said shield means being adapted to flex radially inward and being electrically conductive; and electrically conductive shell means on the rotor and disposed between the superconducting field winding and the shield means, the shell means being spaced radially inwardly from the shield means and being supported against radial loading by the cold parts of the rotor but being thermally isolated from said cold parts, the magnetic field from the superconducting field winding linking both the shield means and the conductive shell means, transient radial loading of the shield means due to transient conditions acting to move the shield means radially inward toward the shell means thereby decreasing the space therebetween and compressing the magnetic field in said space to distribute the transient radial loading to the conductive shell means and thence to said cold parts of the rotor.

2. Apparatus as claimed in claim 1 in which the shield means comprises a plurality of thin cylindrical shells to deflect in the same fashion as a leaf spring.

3. Apparatus as claimed in claim 1 in which the shield means is a wound winding in a non-conducting flexible structure.

4. Apparatus as claimed in claim 1 in which the shield means is a squirrel-cage winding.

5. Apparatus as claimed in claim 1 in which the shield means is an inertia shell free to rotate relative to the other elements of the rotor, said inertial shell being supported at its ends and being separated radially between said ends from the other elements of the rotor by a vacuum space, the inertial shell being free to flex inwardly into said vacuum space when subjected to radial loading.

6. Apparatus as claimed in claim 1 in which the shield means comprises a plurality of thin cylindrical shells that are mechanically independent.

7. Apparatus as claimed in claim 6 in which the thin cylindrical shells normally operate at different temperatures.

8. A superconducting machine having, in combination: a rotor with a superconducting field winding; a normally conducting armature on the stator of the machine; shield means of thickness $b$ on the rotor and disposed between the superconducting field winding and the normally conducting armature, said shield means being flexible in that it can flex inwardly toward its axis under the influence of radial forces; and conductive shell means of thickness $c$ disposed between the superconducting field winding and the shield means, the conductive shell means being spaced from the shield means a distance $a$, mechanical connection between the two being only at or near the ends of each, the shell means being supported by the cold parts of the rotor but being thermally isolated from said cold parts by thermal insulation pieces that transmit mechanical forces, the magnetic field of the field winding linking both the shield means and the conductive shell means, transient radial loading forces upon the shield means being carried on compression of the magnetic field to the conductive shell means to transfer some of the radial loading to the conductive shell means and thence to said cold parts, the thickness $b$ and $c$ and the distance $a$ being adequate to prevent touching of the shield means and the conductive shell means at the center of each during imposition of said transient radial forces.

9. A superconducting machine as claimed in claim 8 that includes a rotor body, the field winding and the conductive shell means being in the form of a mechanical composite sandwich structure of which the rotor body is the innermost element and in which the shell means is thermally isolated from the field winding, the sandwich structure acting as a unit to absorb radial loading transmitted to the conductive shell means upon compression of the magnetic field during transients, said composite sandwich structure being at or near cryogenic temperature.

10. A superconducting machine as claimed in claim 8 in which the rotor is a nested structure in which the shield means is a cylindrical conductive shield, is the outermost element of the rotor, and is separated except at its ends, from the conductive shell means by an annular vacuum space, the conductive shell means, and the rotor body also being cylindrical, the superconducting winding being separated axially from the ends of the rotor to effect thermal isolation and being isolated thermally as well by said annular vacuum space and by a central or inner vacuum space, mechanical attachment of the composite sandwich structure to the rotor ends being by relatively thin cylindrical members at the ends of the rotor to effect thermal isolation and being isolated thermally as well by said annular vacuum space and by a central or inner vacuum space, mechanical attachment of the composite sandwich structure to the rotor ends being by relatively thin cylindrical members at the ends that minimize axial thermal transfer between the cold or cryogenic region of the machine and the ambient.

11. A superconducting machine having, in combination: a superconducting field winding on the rotor of the machine; a normally conducting armature magnetically coupled to the field winding; radially flexible electrically conductive shield means disposed on the rotor and between the field winding and the armature; and electrically conductive shell means disposed on the rotor between the field winding and the shield means and radially spaced from the shield means, the shell means being supported by the cryogenic parts of the machine but being thermally isolated from said cryogenic parts, the magnetic field of the field winding linking both the shield means and the conductive shell means, transient loading acting to move the shield means radially toward the conductive shell means to compress the magnetic field between the two and transfer at least some of transient loading from the shield means to the conductive shell means and therefore to other parts of the rotor, the shield means and the shell means being spaced from each other a sufficient distance that the two do not touch during said transient loading.

12. A superconducting machine as claimed in claim 11 in which the electrically conductive shell means is a wound winding.

13. A rotating superconducting machine that comprises, in combination: superconducting field means; normally conducting armature means magnetically coupled to the superconducting field means; and means to protect the cryogenic parts of the machine from stresses that occur during transient conditions, said means to protect comprising radially flexible electrically conductive shield means disposed between the superconducting field means and the armature means and electrically conductive shell means disposed between the superconducting field means and the shield means and being supported in part by said cryogenic parts, the conductive shell means being spaced radially from the shield means and being supported by the cryogenic parts of the field means; the magnetic field of the superconducting field means linking the shield means and the shell means, a portion of the shield means in the course of said transient conditions being moved in radially toward the shell means to reduce the space therebetween to compress the magnetic field between the shield means and the shell means, such space reduction being sufficient to distribute transient loading to the shell means and thence to the cryogenic parts.

* * * * *